Figure 1:
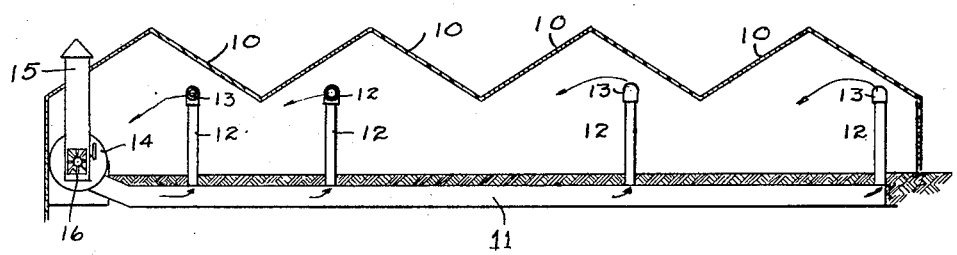

Oct. 6, 1931.  M. A. EIBEN  1,826,607

METHOD AND APPARATUS FOR PROMOTING PLANT GROWTH IN GREENHOUSES

Filed June 8, 1928

Inventor
Michael A. Eiben
By Bates, Macklin, Gobrick & Teare
Attorneys

Patented Oct. 6, 1931

1,826,607

UNITED STATES PATENT OFFICE

MICHAEL A. EIBEN, OF CLEVELAND, OHIO

METHOD AND APPARATUS FOR PROMOTING PLANT GROWTH IN GREENHOUSES

Application filed June 8, 1928. Serial No. 283,752.

This invention relates to the treatment of plants in greenhouses and has for an object, the provision of a system of ventilation, by means of which the rate and character of growth of plants may be greatly improved. The invention in its present form is especially adapted for use in large greenhouses comprising long bays which are arranged side by side, and each of which is approximately 300 or 400 ft. or more in length.

The problem of expediting growth of plants in greenhouses of this size is a difficult one, in view of the large areas and the unequal content of moisture in various parts of the structure. For example, in one bay, there may be certain plants of 3 or 4 feet in height, while in the adjacent bay there may be potted plants only 8 or 10 inches in height. For a given humidity, the plants in one part of the greenhouse may thrive, while in another part, plant growth may be retarded and even destroyed. It is desirable therefore, to enable the humidity conditions to be varied and to be completely controlled notwithstanding the size and the number of plants under cultivation.

Variations in humidity as affecting plant growth are exceptionally apparent in the growing of tomatoes. Light and moisture conditions in certain localities particularly in the northern part of the United States have prevented the satisfactory growing of plants on a production basis until the spring months of the year. The moisture laden condition of the atmosphere coupled with the inability to maintain uniform heat conditions in a large greenhouse have made the growing of tomatoes a hazardous undertaking during the winter months. In large greenhouses, the heating is usually accomplished by steam coils which naturally cause an uneven heat in different regions. This is readily apparent from the fact that plants adjacent to the radiators have a growth which is increased to a marked degree over those in the adjacent row. Under such conditions, it has been found that on rainy days, the moisture adheres to the plants to such great extent that pollination (which must be done by hand) cannot be accomplished for several days. A delay of four days at the proper time for this operation frequently results in crop failure. In addition, a high humidity is injurious as it retards plant growth and produces fruit clusters for tomatoes at approximately 16 inch intervals along the main stem and limits the height of the vines to about 6 feet.

The present invention is concerned with a method of expediting plant growth by the use of a moving current of air. The problems presented in the operation of large commercial greenhouses are quite different from those usually present in small residential greenhouses. In the small type of house where the predominating type of growth embodies small plants and where the heating conditions are more or less ideal, the circulation of air in the greenhouse is a simple matter. In fact, a small electric fan which directs the air against the plants is considered sufficiently adequate for the purpose. In large commercial greenhouses however, such procedure is inadequate. The current of air set in motion by a small electric fan might benefit the plants directly in front of it, but it would not affect plants eight or ten feet away. When it is considered that greenhouses are three or four hundred feet in length and are built with a large number of adjoining bays which are open into each other, it is obvious that the use of small fans placed at separated points would be impractical.

It has also been found that the introduction of air on a large scale through mushroom outlets at spaced intervals along the floor in a greenhouse is ineffective as it only benefits those plants, which are in the immediate vicinity of the outlets. The promiscuous use of mushroom outlets is also expensive and requires an objectionable amount of floor space. If heat is transmitted through this form of outlet, the plants have a tendency to dry out, as the warm air is blown directly against the base of the plants. The air also dries out the ground.

The direction of air movement and the position of the outlets from the ducts with reference to the plants therefore are important factors in plant growth. I have found by moving the air in a direction extending longitudinally of the greenhouse bays and above the tops of the plants, that surprising and valuable improvements in plant growth are obtained and that such changes are most noticeable in the growth of tomatoes. I have found that plants treated in this way do not vary in degree of growth in proportion to the proximity of the plants to the outlets but that growth is uniform throughout the length of the greenhouse. In addition, I have found that the air moving above the tops of the plants induces a flow between and around the bottom of the plants and enables them to be handled for pollination at any desired time.

I have also found that my method permits plants to be watered at frequent intervals thus enabling the roots to receive adequate moisture notwithstanding the percentage of moisture in the atmosphere. Under the old system, plants could not be watered on days when the atmosphere was heavily laden with moisture as the rate of evaporation would be retarded to a prohibitive degree.

Figure 2:
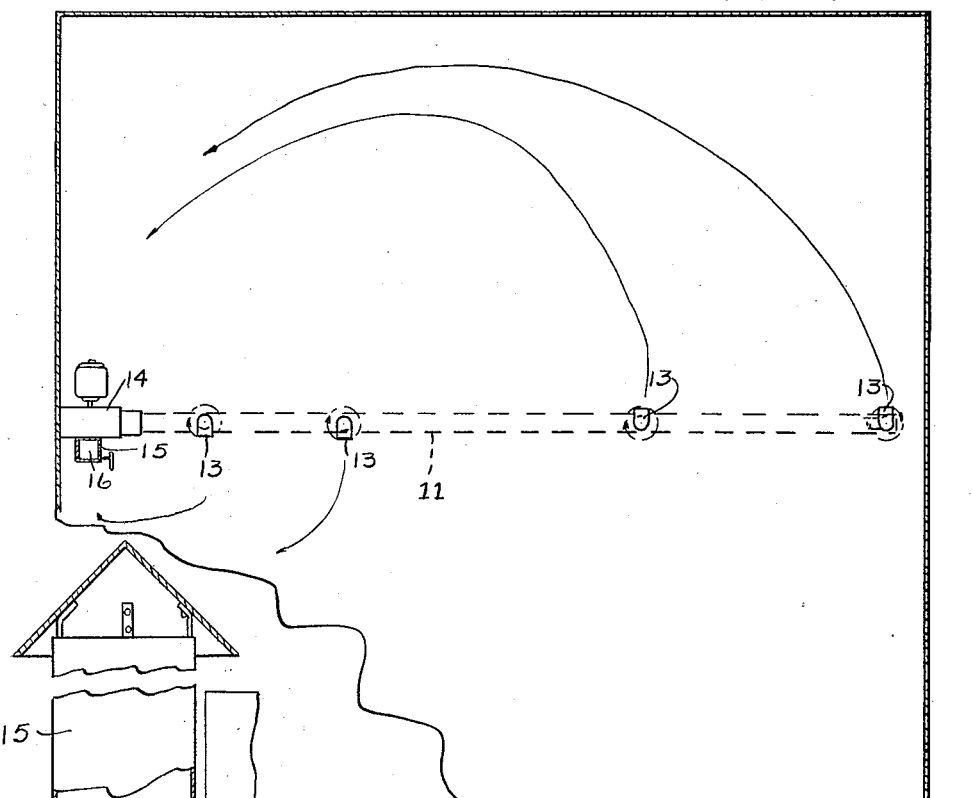
Figure 3:
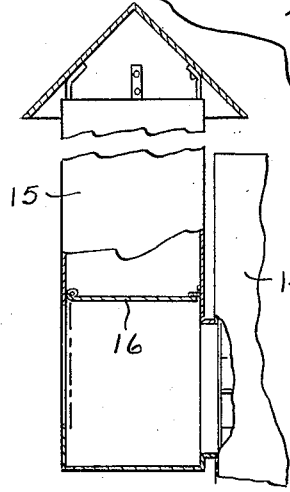

In the drawings, Fig. 1 is a transverse section through a greenhouse having an apparatus therein embodying my invention; Fig. 2 is a plan view of the greenhouse shown in Fig. 1; and Fig. 3 is a view showing part of the inlet conduit to the blower.

The greenhouse, which I have shown, has bays 10 arranged side by side and of equal length. The space between the bays is open so that access for movement of air is provided between the bays and within the entire structure. Midway between the ends of the bays, I have shown a central underground air duct 11 which has risers 12 leading therefrom at convenient spaced intervals, and terminating in outlets at points above the tops of the plants. A blower indicated in general at 14 functions to force air through the main conduit and out of the respective risers. The blower is arranged to draw air either from the exterior part of the greenhouse through a conduit 15, or from the interior part of the greenhouse. A damper 16 controls the kind or proportion of air admitted to the blower and variations in the volume of air admitted to the blower. Variations in the volume of air utilized may be satisfactorily controlled so that at times the exterior air may be entirely excluded or the recirculation of the interior air may be entirely excluded.

A method of operating the system in accordance with the apparatus described is to direct the outlets so as to cause a movement of air in a direction lengthwise of the rows and above the tops of the plants under cultivation. In some instances, it may be desirable to utilize a swivel outlet 13 at the top of each riser, so as to direct the flow of air first in one direction, and then in the opposite direction, and to alternate such movement until the desired conditions are obtained. This system is utilized where economy is desired. Another system embodies the use of stationary outlets which lead in opposite directions from the risers thus enabling air to be moved substantially toward each end of the greenhouse. This system is employed where economy in the size of the blower is not the controlling factor. In both methods however, the moving current of air is caused to flow above the tops of the plants and preferably in the upper regions of the greenhouse. If the upper windows are closed, the air returns to the blower and is recirculated. By utilizing heating coils in conjunction with the blower, then the temperature of the air may be satisfactorily and uniformly controlled. In accordance with this method of operation, vapor laden air may be easily set in motion and plants may be quickly dried, although they are not directly in the path of the air blast.

A further important advantage of my invention is the fact that desirable gases may be ejected into the greenhouse for controlling insects and disease. The introduction of smoke, for example, heretofore has necessitated the use of smudge pots which have been hung at spaced intervals throughout the greenhouse. With the present invention, a few smudge pots placed before the blower inlet produces satisfactory results and reduces the number of smudge pots required by about 80%. In addition, plants may be satisfactorily dusted by ejecting the dusting material into the blower and allowing it to be blown into the atmosphere above the plants.

As applied to the growth of tomatoes, I have found that this invention enables the plants to be speedily dried and not only permits pollination to be performed at any desired time including the rainy season but even causes pollination to occur automatically to an appreciable extent. It is well known that this operation cannot be satisfactorily performed when the plants are wet, hence under my system, the crop yield reaches a maximum degree. In addition, it has been found that the clusters of fruit are spaced from eight to ten inches apart upon the vines and that the vines reach a height of 10 feet. Moreover, the average number of tomatoes has been increased from three or four to eight or ten per cluster, and in one instance a cluster of eighteen tomatoes has been grown. Furthermore, the first fruit may be picked at a much earlier time. Such fruit naturally commands a higher price. A further important advantage is that tomatoes may be grown in months heretofore regarded as impractical for this purpose.

I claim:

1. A method of promoting the plant growth in a greenhouse comprising, ejecting air under pressure at the mid-portion and in the upper region of the greenhouse, and alternately directing the air toward opposite ends of the greenhouse.

2. A method of promoting plant growth in a greenhouse, comprising causing a current of air to move above the soil and uniformly in the same general direction longitudinally of the greenhouse and throughout the width and height thereof, to the end of the house and with sufficient pressure to dry all of the plants therein, and then returning at least some of the air along one side of the greenhouse, and recirculating it, whereby a continuous uniform movement of air is caused to flow above the tops and throughout the length of the plants under cultivation therein.

3. A method of promoting plant growth in a greenhouse having closely set rows of vines therein, comprising causing a moving current of air to flow lengthwise of the rows, and with sufficient pressure to effect adequate circulation throughout the entire length of the vines and thereby to absorb the excess of moisture in time to prevent the formation of leaf mould, and recirculating at least part of the air.

4. A method of promoting plant growth in a greenhouse, comprising causing a moving current of air to flow lengthwise of the greenhouse from different outlets, which are so positioned that each tends to assist the others in moving the air in a continuous current lengthwise of the house, and with sufficient pressure to assure circulation throughout the entire length of thickly set vines within the greenhouse, and to remove the excess of moisture thereon, and thereby prevent the formation of leaf mould.

5. A method of promoting plant growth in a greenhouse comprising mixing outside and inside air and then causing the mixed air to flow through different outlets within the greenhouse and so arranging the outlets that the air flowing from each tends to assist the others in causing a column of air to flow lengthwise of the greenhouse, and with sufficient force to effect circulation between and around plants disposed within the greenhouse and between vertically extending and closely set vines that are disposed within the greenhouse.

6. In combination, a greenhouse comprising a plurality of bays arranged side by side, a blower, an air inlet conduit for the blower, said conduit having a plurality of inlets, one opening into the interior of the greenhouse and the other opening to the exterior of the greenhouse, a damper adjacent the inlet conduit for selectively directing the entrance of air into the blower from the exterior and interior part of the greenhouse through said openings, said inlet conduit being adapted to receive insecticides that are introduced with air flowing into the blower, an exhaust conduit extending from the blower transversely of the bays of the greenhouse and outlets leading from said exhaust conduit, said outlets being directed to cause a moving current of air to travel in the same general direction lengthwise of the greenhouse.

In testimony whereof, I hereunto affix my signature.

MICHAEL A. EIBEN.